United States Patent [19]

Hasegawa

[11] Patent Number: 5,173,823
[45] Date of Patent: * Dec. 22, 1992

[54] MAGNETIC HEAD FOR MAGNETIC RECORDING APPARATUS USING A SOFT MAGNETIC ALLOY FILM CONSISTING PRIMARILY OF IRON

[75] Inventor: Naoya Hasegawa, Sendai, Japan

[73] Assignee: Alps Electric Co., Ltd., Tokyo, Japan

[*] Notice: The portion of the term of this patent subsequent to Apr. 14, 2009 has been disclaimed.

[21] Appl. No.: 575,265

[22] Filed: Aug. 30, 1990

[30] Foreign Application Priority Data

Oct. 17, 1989 [JP] Japan .................. 1-269697

[51] Int. Cl.$^5$ .................. G11B 5/235; G11B 5/147
[52] U.S. Cl. .................. 360/120; 360/126
[58] Field of Search .......... 360/126, 125, 122, 120, 360/119; 148/300, 306; 420/9, 10, 13, 125, 127; 427/131; 428/900

[56] References Cited

U.S. PATENT DOCUMENTS

| | | | |
|---|---|---|---|
| 4,201,837 | 5/1980 | Lupiski .................. | 360/126 |
| 4,318,738 | 3/1982 | Masumoto et al. .......... | 148/403 |
| 4,413,295 | 11/1983 | Kato et al. .............. | 360/126 |
| 4,414,554 | 11/1983 | Springer ................. | 360/126 |
| 4,488,195 | 12/1984 | Yanagiuchi et al. ........ | 360/126 |
| 4,578,728 | 3/1986 | Sakakima et al. .......... | 360/125 |
| 4,650,712 | 3/1987 | Hirose ................... | 360/126 |
| 4,764,832 | 8/1988 | Enz et al. ............... | 360/120 |
| 4,834,814 | 5/1989 | Hasegawa et al. .......... | 148/304 |
| 4,918,555 | 4/1990 | Yoshizawa et al. ......... | 360/126 |
| 5,028,280 | 7/1991 | Ihara et al. ............. | 148/307 |
| 5,031,063 | 7/1991 | Hasegawa ................. | 360/120 |
| 5,084,795 | 1/1992 | Sakakima et al. .......... | 360/120 |
| 5,104,464 | 4/1992 | Hasegawa ................. | 148/300 |

FOREIGN PATENT DOCUMENTS

| | | | |
|---|---|---|---|
| 60-26624 | 2/1985 | Japan .................... | 148/305 |
| 2147608 | 5/1985 | United Kingdom .......... | 148/305 |

OTHER PUBLICATIONS

N. N. Greenwood and A. Earnshaw, "Chemistry of the Elements", Pergamon Press, New York, 1986, pp. 318–322.

Primary Examiner—Stuart S. Levy
Assistant Examiner—Craig A. Renner
Attorney, Agent, or Firm—Guy W. Shoup; David W. Heid

[57] ABSTRACT

Disclosed is a soft magnetic alloy having a composition expressed by the formula $Fe_xM_zC_w$, wherein M represents at least one element from the group consisting of Ti, Zr, Hf, Nb, Ta, Mo and W; and x, z and w represent ratios of the respective elements in terms of atom % and satisfy $50 \leq x \leq 96$,
$2 \leq z \leq 30$,
$0.5 \leq w \leq 25$,
$x + z + w = 100$.

The alloy is comprised of crystalline particles with an average grain size of 0.08 μm or less and contains crystalline carbides of element M. A magnetic head comprising such a soft magnetic alloy film has excellent saturated flux density, is resistant to wear, and has excellent recording and reproduction properties.

4 Claims, 2 Drawing Sheets

| | COMPOSITION OF FILM | SATURATED FLUX DENSITY Bs | COERCEIVE FORCE Hc | PERMEABILITY $\mu$ | |
|---|---|---|---|---|---|
| | | | | 0.75 MHz | 5MHz |
| PRESENT INVENTION | $Fe_{79.4} Ta_{9.5} C_{11.1}$ | 15,400 G | 0.23 Oe | 2,650 | 1,570 |
| COMPARATIVE EXAMPLE | $Co_{83.8} Ta_{10.1} Hf_{6.1}$ | 7,600 G | 0.21 Oe | 2,000 | 1,100 |

| | RECORDING LEVEL | | REPRODUCTION LEVEL | |
|---|---|---|---|---|
| | 0.75 MHz | 5 MHz | 0.75 MHz | 5 MHz |
| PRESENT INVENTION | +2.7 dB | +2.0 dB | +1.0 dB | +0.5 dB |
| COMPARATIVE EXAMPLE | 0 dB | 0 dB | 0 dB | 0 dB |

MAGNETIC HEAD FOR MAGNETIC RECORDING APPARATUS USING A SOFT MAGNETIC ALLOY FILM CONSISTING PRIMARILY OF IRON

BACKGROUND OF THE INVENTION

1. Field of the Invention

The present invention relates to a magnetic head which uses a soft magnetic alloy film.

2. Related Art Statement

In the magnetic recording technical field, the coercive force of the recording medium such as the magnetic tape or the like has been improved for the purpose of raising the recording density. Accordingly, there has been desired a material for the magnetic core of the magnetic head exhibiting high saturated flux density (Bs).

However, the conventional ferrite magnetic head has been able to realize only the saturated flux density of about 5000 G (Gauss). Therefore, the desire for realizing the high density has not been satisfied. Therefore, a metal-in-gap-head, that is, a laminated head or a thin film head formed by sandwiching the metal magnetic laminated film by ceramic plates or the like has been disclosed.

The soft magnetic material (film) having high saturated flux density for use in various magnetic heads is exemplified by an Fe-Si-Al alloy (Sendust). Recently, non-crystal alloy film the main component of which is Co which is a ferromagnetic metal element has been developed.

Furthermore, a film exhibiting high saturated flux density and having excellent soft magnetic characteristics has been disclosed in which an alloy film (Fe-C, Fe-Si or the like) formed by fine crystal the main component of which is Fe is employed so as to reduce an influence (undesired influence which acts on the soft magnetic characteristics) from the crystal magnetic anistropy of Fe by the fining of the crystal.

However, equipment that include a magnetic head have been reduced in size and weight. Therefore, the equipment tend to be subjected to vibration due to the transport of the equipment or use under bad conditions. Therefore, the magnetic head must have excellent magnetic characteristics, wear resistance against the magnetic head, durability in terms of the temperature and corrosive atmosphere, that is, environmental resistance and vibration resistance. Therefore, the gap forming or mounting into the case must be performed by glass-deposition. Therefore, the material for forming the magnetic head must withstand the high temperature of the glass depositing process in the magnetic head manufacturing process.

However, the conventional soft magnetic alloy film made of Sendust exhibits saturated flux density of about 10000 G which is insufficient for realizing the future desire of raising the density. Although high saturated flux density of 13000 or more has been obtained from the conventional Co amorphous alloy film, the quantity of addition of Ti, Zr, Hf, Nb, Ta, Mo, W and the like which form the amorphous must be reduced when the saturated flux density of the amorphous alloy is desired to be raised. If the quantity of the addition is reduced, the stability of the amorphous structure deteriorates. As a result, it cannot withstand the temperature (about 500° C. or higher) necessary for performing the glass deposition.

Furthermore, the alloy film (Fe-C, Fe-Si or the like) formed by the fine crystal the main component of which is Fe encounters crystal growth at high temperature, causing the soft magnetic characteristics to be deteriorated (the highest temperature is 400° C. in the case of Fe-C). Also the above-described alloy cannot be preferably employed to be subjected to the glass deposition.

SUMMARY OF THE INVENTION

Accordingly, an object of the present invention is to provide a magnetic head exhibiting excellent recording and reproducing characteristics.

An aspect of the present invention according to a first embodiment lies in a magnetic head comprising elements expressed by a composition formula $Fe_xM_zC_w$, where M is composed of one or more metal elements selected from Ti, Zr, Hf, Nb, Ta, Mo and W, and the composition ratio of x, z and w meets the following relationships by atom %: $50 \leq x \leq 96$, $2 \leq z \leq 30$, $0.5 \leq w \leq 25$, $x+z+w=100$, the metal structure of which is basically formed by crystal grain having an average grain size of 0.08 μm or less and a soft magnetic alloy film which partially contains a crystal phase of a carbide of element M is used in the overall body or partially in a magnetic core.

Another aspect of the present invention according to the first embodiment lies in that the metal structure is basically formed by the crystal grain having an average grain size of 0.08 μm or less and non-crystal structure.

Another aspect of the present invention according to a second embodiment lies in a magnetic head comprising elements expressed by a composition formula $Fe_x T_y M_z C_w$, where T is composed of one or more metal elements selected from Co and Ni, M is composed of one or more metal elements selected from Ti, Zr, Hf, Nb, Ta, Mo and W, and the composition ratio of x, y, z and w meets the following relationships by atom %: $50 \leq x \leq 96$, $0.1 \leq y \leq 10$, $2 \leq z \leq 30$, $0.5 \leq w \leq 25$, $x+y+z+w=100$, the metal structure of which is basically formed by crystal grain having an average grain size of 0.08 μm or less and a soft magnetic alloy film which partially contains a crystal phase of a carbide of element M is used in the overall body or partially in a magnetic core.

Another aspect of the present invention according to the second embodiment lies in that the metal structure is basically formed by the crystal grain having an average grain size of 0.08 μm or less and non-crystal structure.

According to the present invention, excellent recording/reproducing characteristics can be obtained.

Other and further objects, features and advantages of the invention will be apparent from the following description.

PREFERRED EMBODIMENTS OF THE INVENTION

A preferred embodiment of the present invention will now be described with reference to the drawings.

Figures 1, 2, 4:
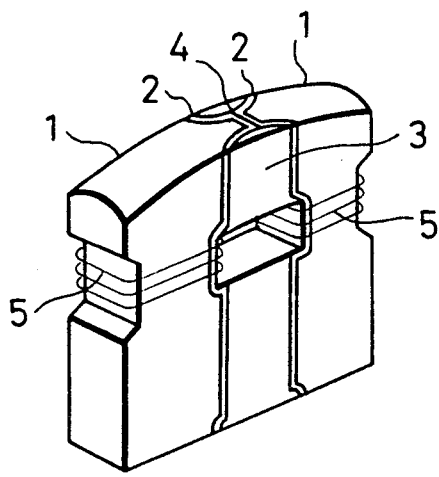
FIG. 1 is a perspective view which illustrates the structure of an embodiment of a magnetic head according to the present invention.
FIG. 2 illustrates the composition and the magnetic characteristics of a thin film for use in an embodiment of the present invention and that of the comparison example.
FIG. 4 illustrates the recording characteristics and the reproducing characteristics of an embodiment of the present invention and that according to the comparative example.

FIG. 1 is a perspective view which illustrates the structure of an embodiment of a magnetic head (metal-in-gap head) according to the present invention. Referring to the drawing, reference numeral 1 represents a magnetic core made from monocrystals of Mn-Zn ferrite and 2 represents a soft magnetic alloy film formed on the magnetic core 1. The soft magnetic alloy film 2 the composition and the magnetic characteristic of which are as shown in the upper row of FIG. 2 (where the magnetic permeability $\mu$ is the value obtainable at the frequency shown in FIG. 2). Reference numeral 3 represents a glass plate manufactured by depositing glass, 4 represents a gap and 5 represents a coil.

The specifications and dimensions of the magnetic head according to this embodiment of the present invention are arranged as follows:

| | |
|---|---|
| Thickness of the soft magnetic alloy film | 6 $\mu$m |
| Width of a track | 27 $\mu$m |
| Depth of the gap | 18 $\mu$m |
| Length of the gap | 0.25 $\mu$m |
| Inductance (5 MHz) | 1.7 $\mu$H |

The soft magnetic alloy film 2 is manufactured by a thin film forming apparatus such as a sputtering apparatus and an evaporating apparatus. Carbon is added to the film by forming a combined target by placing graphite pellet on the target plate so as to be sputtered or by employing a reactive sputtering method in which a target (Fe-T-M) containing no carbon is used and is subjected to sputtering in gas atmosphere formed by mixing hydrocarbon gas such a methane ($CH_4$) into an inert gas such as Ar.

Since the film, as it is, contains a considerably high percentage of the amorphous phase and therefore it is unstable, micro-crystal must be deposited by applying heat at about 400° to 700° C. If the above-described heat treatment is performed in a rotary magnetic field, further improved soft magnetic characteristics can be obtained. Furthermore, the above-described heat treatment may be performed during the glass deposition process.

As for a further detailed method of forming the soft magnetic alloy film 2, refer to U.S. Pat. No. 5,104,464, issue date Apr. 14, 1992, entitled "Soft Magnetic Alloy Film", which is assigned to the assignee of the present invention and discloses a soft magnetic alloy film. This patent is incorporated herein by reference in its entirety.

A comparative example was also prepared by replacing the above-described soft magnetic alloy film 2 formed on the magnetic core 1 by an amorphous alloy film having the composition and the magnetic characteristics as shown in the lower column of FIG. 2.

However, since the saturated flux density (Bs) of the amorphous alloy film is, as shown in FIG. 2, insufficient, the film thickness is increased to compensate for the low saturated flux density (Bs) so that magnetic saturation is prevented.

Figure 3:
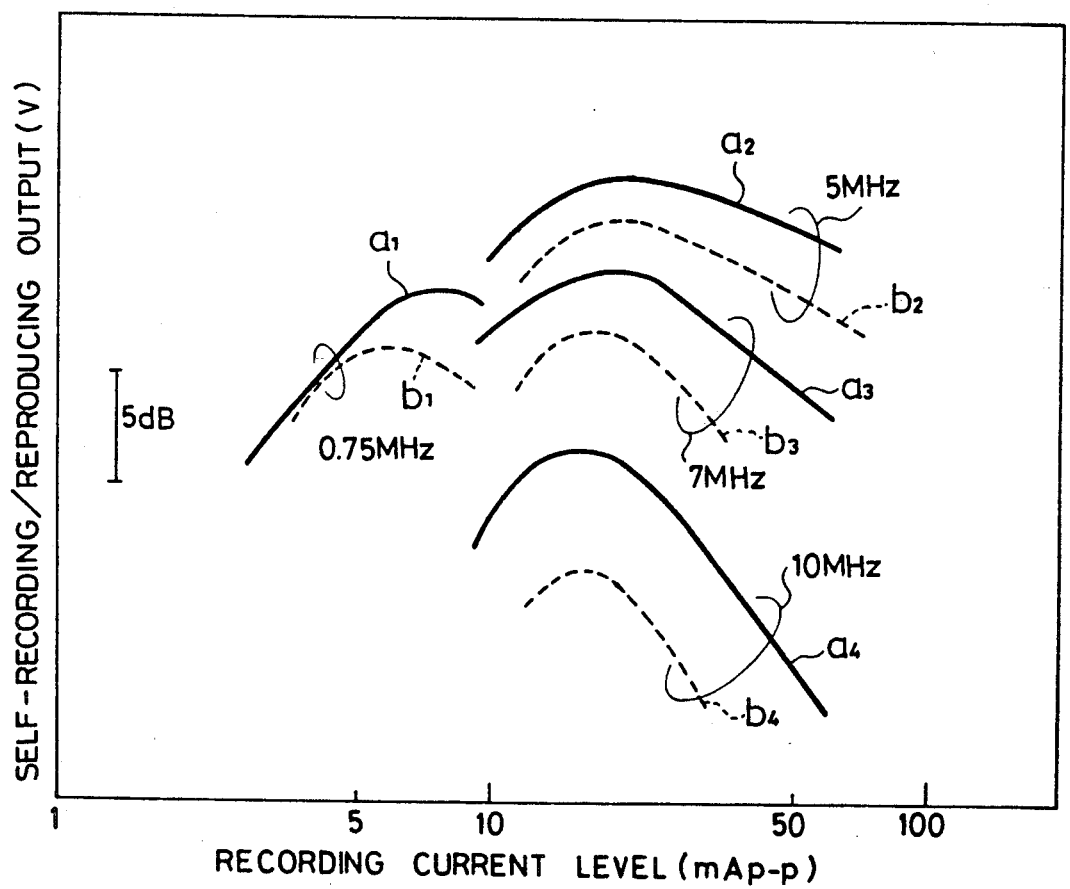
FIG. 3 illustrates the self-recording/reproducing characteristics of the magnetic head according to an embodiment of the present invention and that according to the comparative example.

FIG. 3 illustrates the characteristics (the self-recording/reproducing output with respect to the recording current allowed to pass through the coil 5 of the magnetic head) of the magnetic head according to the present invention and those of the magnetic head according to the comparative example, the characteristics being obtained by performing a self-recording/reproducing with respect to an application type metal tape having a coercive force (Hc=1,400 Oe) at relative speed of 3.75 m/s. Referring to the drawing, curves a1 to a4 show the characteristics of the magnetic head according to the present invention, while curves b1 to b4 show the characteristics of the magnetic head according to the comparative example.

Referring to FIG. 3, the characteristics shown by the curves a2 to a4 and those shown by the curves b2 to b4 were obtained from a recording operation at a single recording frequency. However, the characteristics shown by the curves a1 and b1 show the output at a frequency of 0.75 MHz in the case where the recording was performed by mixing a signal of 0.75 MHz and a signal of 5 MHz (however, the recording current is four times).

As can be seen from FIG. 3, the magnetic head according to the present invention provides improved performance over a conventional magnetic head by 2 to 3 dB at any recording frequencies.

FIG. 4 shows the recording characteristics and the reproducing characteristics of the magnetic head according to the present invention and those according to the comparative example measured by using a reference head designed exclusively for the recording operation and that designed exclusively for the reproducing operation.

Each characteristic of the magnetic head according to the comparative example is standardized to 0 dB.

As can be clearly seen from FIG. 4, the magnetic head according to the present invention exhibits both excellent recording and reproducing characteristics in comparison to the conventional magnetic head. The reason for the excellent recording characteristics lies in the high saturated flux density (Bs) of the soft magnetic alloy film 2. The reason for the excellent reproducing characteristics lies in the high magnetic permeability ($\mu$) of the soft magnetic alloy film 2.

The soft magnetic alloy film used in the magnetic head according to the present invention has a Vickers hardness of 1040 which is harder than that of the conventional amorphous film (800 to 900) and that of the Sendust (Fe-Si-Al) film (600 to 800). Therefore, wear taking place in the magnetic head due to the contact between the tape and the magnetic head can be substantially reduced. As a result, a reliable magnetic head in terms of tape running can be obtained.

As described above, the present invention employs a film exhibiting higher saturated flux density in comparison to that of the conventional soft magnetic film. Therefore, excellent recording characteristics can be obtained and higher magnetic permeability than that of the conventional film. Therefore, excellent reproducing characteristics can be obtained.

Therefore, the present invention will contribute to an improvement in the S/N ratio and in the quality of the image if it is employed in a VTR.

Since the soft magnetic film for use in the magnetic head according to the present invention exhibits excellent thermal stability, the working temperature for forming the gap or the like by glass deposition can be performed at a higher temperature. Therefore, a desired glass material, the melting point of which is intermediate or higher and which exhibits satisfactory reliability in terms of the environmental resistance or strength, can be used.

Furthermore, since the soft magnetic film for use in the magnetic head according to the present invention has satisfactory hardness, a magnetic head exhibiting satisfactory reliability in terms of wear resistance or the like can be obtained.

The conventional amorphous alloy film or the like suffers from anistropic dispersion if no heat treatment is not performed in a magnetic field. As a result, sufficient magnetic permeability cannot be easily obtained. However, according to the soft magnetic film for use in the magnetic head according to the present invention, a satisfactory high magnetic permeability can be obtained by a heat treatment performed in the absence of a magnetic field. Therefore, the glass deposition process or the like can be performed in the absence of a magnetic field. As a result, the manufacturing process can be simplified.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A magnetic head comprising:
   first and second core halves having first and second surfaces, respectively, and rigidly connected such that a gap is formed between said first and second surfaces,
   a soft magnetic alloy film disposed on said first and second surfaces,
   said film has a composition of a general formula $Fe_xM_zC_w$, wherein M represents at least one element from a group consisting of Ti, Zr, Hf, Nb, Ta, Mo and W; and x, z and w represent ratios of a plurality of elements in terms of atom % and satisfy $$50 \leq x \leq 96,$$
$$2 \leq z \leq 30,$$
$$0.5 \leq w \leq 25,$$
$$x + z + w = 100;$$

said film contains crystalline carbides of element M; and
   said film comprises crystalline particles with an average grain size of 0.08 μm or less.

2. A magnetic head according to claim 1 wherein said film additionally contains non-crystalline structure.

3. A magnetic head comprising:
   first and second core halves having first and second surfaces, respectively, and rigidly connected such that a gap is formed between said first and second surfaces,
   a soft magnetic alloy film disposed on said first and second surfaces,
   said film ha a composition of a general formula $Fe_xT_yM_zC_w$, wherein T represents at least one element from a group consisting of Co and Ni; M represents at least one element from the group consisting of Ti, Zr, Hf, Nb, Ta, Mo and W; and x, y, z and w represent ratios of a plurality of elements in terms of atom % and satisfy $$50 \leq x \leq 96,$$
$$0.1 \leq y \leq 10,$$
$$2 \leq z \leq 30,$$
$$0.5 \leq w \leq 25,$$
$$x + y + z + w = 100;$$

said film contains crystalline carbides of element M; and
   said film comprises crystalline particles with an average grain size of 0.08 μm or less.

4. A magnetic head according to claim 3 wherein said film additionally contains non-crystalline structure.

* * * * *